(12) United States Patent
Chen et al.

(10) Patent No.: US 11,824,688 B2
(45) Date of Patent: Nov. 21, 2023

(54) CONFIGURING CHANNEL STATE INFORMATION REFERENCE SIGNAL SUBBAND PRECODING RESOURCE BLOCK GROUPS

(71) Applicant: QUALCOMM Incorporated, San Diego, CA (US)

(72) Inventors: Bo Chen, Beijing (CN); Pavan Kumar Vitthaladevuni, San Diego, CA (US); Joseph Binamira Soriaga, San Diego, CA (US); Ruifeng Ma, Beijing (CN); Alexandros Manolakos, Escondido, CA (US); Yeliz Tokgoz, San Diego, CA (US); Tingfang Ji, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/309,369

(22) PCT Filed: Nov. 21, 2018

(86) PCT No.: PCT/CN2018/116605
§ 371 (c)(1),
(2) Date: May 21, 2021

(87) PCT Pub. No.: WO2020/103010
PCT Pub. Date: May 28, 2020

(65) Prior Publication Data
US 2022/0021558 A1 Jan. 20, 2022

(51) Int. Cl.
*H04W 24/10* (2009.01)
*H04L 25/02* (2006.01)
*H04L 5/00* (2006.01)

(52) U.S. Cl.
CPC ........ *H04L 25/0202* (2013.01); *H04L 5/0057* (2013.01); *H04W 24/10* (2013.01)

(58) Field of Classification Search
CPC ... H04L 25/0202; H04L 5/0057; H04W 24/10
(Continued)

(56) References Cited

U.S. PATENT DOCUMENTS 8,923,143 B2 12/2014 Gorokhov et al.
2015/0029966 A1 1/2015 Park et al.
(Continued)

FOREIGN PATENT DOCUMENTS

CN 102714566 A 10/2012
CN 103997722 A 8/2014
(Continued)

OTHER PUBLICATIONS

Huawei, :Remaining issues for CSI reporting, Dec. 2017, 3GPP TSG RAN WG1 Meeting #91 (Year: 2017).*
(Continued)

*Primary Examiner* — Christopher R Crompton
(74) *Attorney, Agent, or Firm* — Harrity & Harrity, LLP/Qualcomm Incorporated

(57) ABSTRACT

Various aspects of the present disclosure generally relate to wireless communication. In some aspects, a user equipment may receive a signaling communication that includes information specifying whether a channel state information reference signal (CSI-RS) precoding resource block group includes a same quantity of resource blocks (RBs) that is included in a CSI reporting subband configured for the UE. The CSI-RS precoding resource block group may enable the UE to perform a channel estimation based at least in part on a CSI-RS transmitted by a base station. The UE may perform the channel estimation based at least in part on the CSI-RS transmitted by the base station. The channel estimation may
(Continued)

be based at least in part on whether the CSI-RS precoding resource block group includes the same quantity of RBs that is included in the CSI reporting subband configured for the UE. Numerous other aspects are provided.

30 Claims, 7 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2016/0156401 A1 | 6/2016 | Onggosanusi et al. | |
| 2017/0331670 A1* | 11/2017 | Parkvall | H04W 52/028 |
| 2019/0149306 A1* | 5/2019 | Gao | H04L 5/0023 |
| | | | 370/252 |

FOREIGN PATENT DOCUMENTS

| | | |
|---|---|---|
| CN | 105721032 A | 6/2016 |
| CN | 107371250 A | 11/2017 |
| CN | 108631975 A | 10/2018 |
| WO | 2011008519 A1 | 1/2011 |
| WO | WO-2018204774 A1 | 11/2018 |

OTHER PUBLICATIONS

International Search Report and Written Opinion—PCT/CN2018/116605—ISA/EPO—dated Aug. 21, 2019.
Ericsson: "On CSI Enhancements for MU-MIMO Support", 3GPP TSG-RAN WG1 Meeting #95, R1-1813270, 3rd Generation Partnership Project, Mobile Competence Centre, 650, Route Des Lucioles, F-06921 Sophia-Antipolis Cedex, France, vol. RAN WG1, No. Spokane, USA, Nov. 12-Nov. 16, 2018, Nov. 11, 2018, pp. 1-10, XP051555286.
Huawei., et al., "Remaining Issues for CSX Reporting", 3GPP TSG RAN WG1 Meeting #91, R1-1719425, 3rd Generation Partnership Project, Mobile Competence Centre, 650, Route Des Lucioles, F-06921 Sophia-Antipolis Cedex, France, vol. RAN WG1, No. Reno, USA, Nov. 27-Dec. 1, 2017, Nov. 17, 2017, XP051369127, 9 Pages.
Supplementary European Search Report—EP18940886—Search Authority—Munich—dated Jun. 7, 2022.
ZTE Corporation., et al., "Discussion on CSI Reporting for Hybrid CSI-RS", 3GPP TSG RAN WG1 Meeting #86, R1-166327, Aug. 22-26, 2016, 6 Pages.

* cited by examiner

CONFIGURING CHANNEL STATE INFORMATION REFERENCE SIGNAL SUBBAND PRECODING RESOURCE BLOCK GROUPS

CROSS-REFERENCE TO RELATED APPLICATION

This application is a 371 national stage of PCT Application No. PCT/CN2018/116605, filed on Nov. 21, 2018, and entitled "CONFIGURING CHANNEL STATE INFORMATION REFERENCE SIGNAL SUBBAND PRECODING RESOURCE BLOCK GROUPS," which is incorporated by reference herein.

FIELD OF THE DISCLOSURE

Aspects of the present disclosure generally relate to wireless communication, and more particularly to techniques and apparatuses for configuring channel state information reference signal subband precoding resource block groups.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a signaling communication that includes information specifying whether a channel state information reference signal (CSI-RS) precoding resource block group includes a same quantity of resource blocks (RBs) that is included in a CSI reporting subband configured for the UE, wherein the CSI-RS precoding resource block group enables the UE to perform a channel estimation based at least in part on a CSI-RS transmitted by a base station. The method may include performing the channel estimation based at least in part on the CSI-RS transmitted by the base station, wherein the channel estimation is based at least in part on whether the CSI-RS precoding resource block group includes the same quantity of RBs that is included in the CSI reporting subband configured for the UE.

In some aspects, a UE for wireless communication may include memory and one or more processors operatively coupled to the memory. The memory and the one or more processors may be configured to receive a signaling communication that includes information specifying whether a channel state information reference signal (CSI-RS) precoding resource block group includes a same quantity of resource blocks (RBs) that is included in a CSI reporting subband configured for the UE, wherein the CSI-RS precoding resource block group enables the UE to perform a channel estimation based at least in part on a CSI-RS transmitted by a base station. The memory and the one or more processors may be configured to perform the channel estimation based at least in part on the CSI-RS transmitted by the base station, wherein the channel estimation is based at least in part on whether the CSI-RS precoding resource block group includes the same quantity of RBs that is included in the CSI reporting subband configured for the UE.

In some aspects, a non-transitory computer-readable medium may store one or more instructions for wireless communication. The one or more instructions, when executed by one or more processors of a UE, may cause the one or more processors to receive a signaling communication that includes information specifying whether a channel state information reference signal (CSI-RS) precoding resource block group includes a same quantity of resource blocks (RBs) that is included in a CSI reporting subband configured for the UE, wherein the CSI-RS precoding resource block group enables the UE to perform a channel estimation based at least in part on a CSI-RS transmitted by a base station. The one or more instructions, when executed by one or more processors of a UE, may cause the one or more processors to perform the channel estimation based at least in part on the CSI-RS transmitted by the base station, wherein the channel estimation is based at least in part on whether the CSI-RS precoding resource block group includes the same quantity of RBs that is included in the CSI reporting subband configured for the UE.

In some aspects, an apparatus for wireless communication may include means for receiving a signaling communication that includes information specifying whether a channel state information reference signal (CSI-RS) precoding resource block group includes a same quantity of resource blocks (RBs) that is included in a CSI reporting subband configured for the apparatus, wherein the CSI-RS precoding resource block group enables the apparatus to perform a channel estimation based at least in part on a CSI-RS transmitted by a base station. The apparatus may include means for performing the channel estimation based at least in part on the CSI-RS transmitted by the base station, wherein the channel estimation is based at least in part on whether the CSI-RS precoding resource block group includes the same quantity of RBs that is included in the CSI reporting subband configured for the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
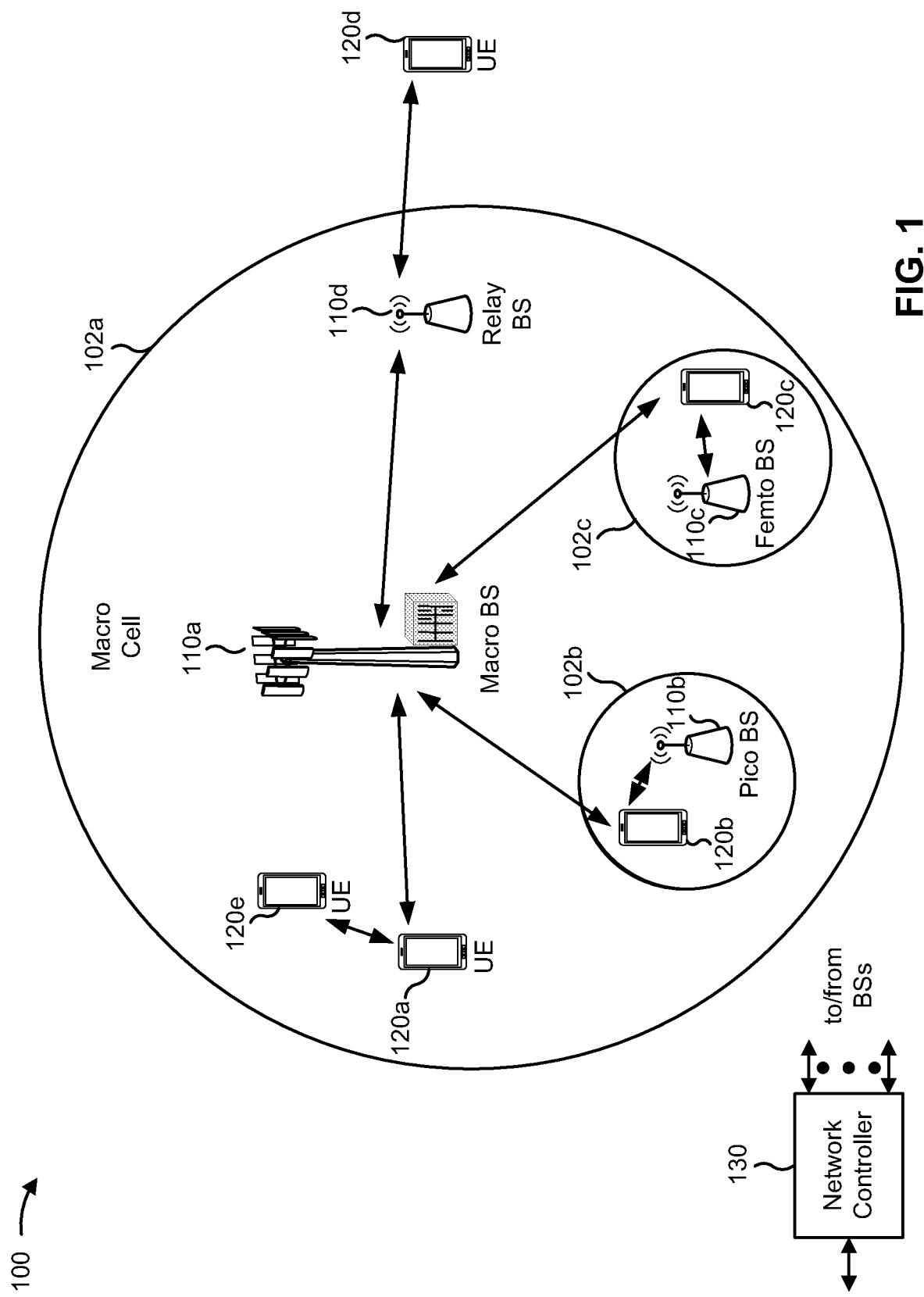
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
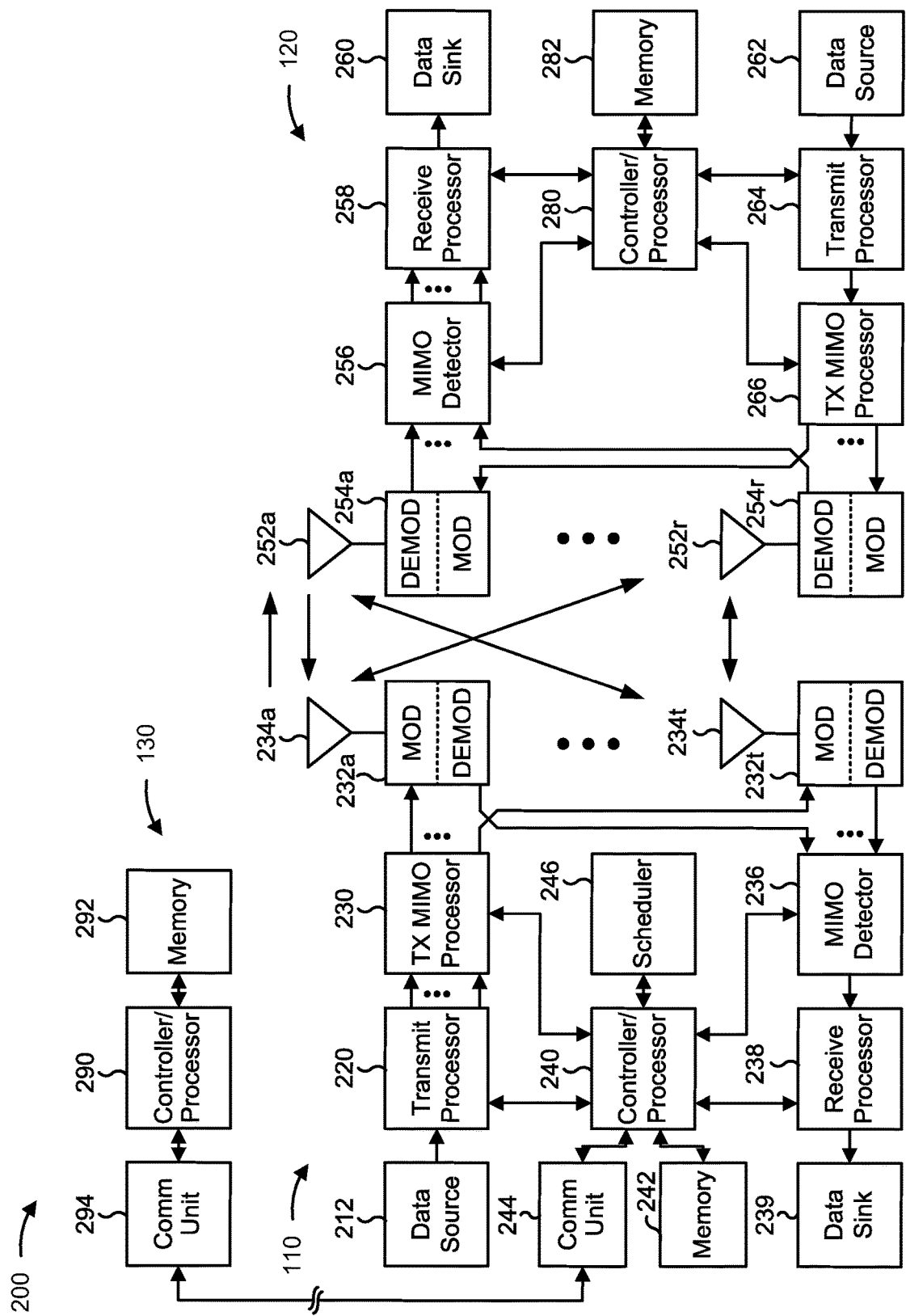
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234 (illustrated as antennas 234a through 234t), and UE 120 may be equipped with R antennas 252 (illustrated as antennas 252a through 252r), where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232 (illustrated as modulators 232a through 232t). Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254 (illustrated as demodulators 254a through 254r), respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring channel state information reference signal subband precoding resource block groups, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. For example, memory 282 can include a non-transitory computer-readable medium storing one or more instructions for wireless communication, the one or more instructions comprising, for example, instructions instructing or causing one or more processors to perform the functions described with reference to process 600 of FIG. 6, and/or other processes as described herein. Additionally or alternatively, memory 282 can receive and store such instructions from an other non-transitory computer-readable medium containing such instructions. A scheduler 246 may schedule UEs for data transmission on the downlink and/or uplink.

In some aspects, UE 120 may include means for receiving a signaling communication that includes information specifying whether a channel state information (CSI) reference signal (CSI-RS) precoding resource block group includes a same quantity of resource blocks (RBs) that is included in a CSI reporting subband configured for the UE, wherein the CSI-RS precoding resource block group enables the UE to perform a channel estimation based at least in part on a CSI-RS transmitted by a base station, means for performing the channel estimation based at least in part on the CSI-RS transmitted by the base station, wherein the channel estimation is based at least in part on whether the CSI-RS precoding resource block group includes the same quantity of RBs that is included in the CSI reporting subband configured for the UE, and/or the like. More generally, UE 120 may include means for performing any of the functionality described throughout this specification, and in particular, process 600 with reference to FIG. 6. In some aspects, such means may, but not necessarily, include one or more components of UE 120 described in connection with FIG. 2, for example, any combination of antennas 252a-252r, DEMOD/MOD 254a-254r, MIMO detector 256, receive processor 258, controller/processor 280, and/or memory 282.

As indicated above, FIG. 2 is provided merely as an example. Other examples may differ from what was described with regard to FIG. 2.

Figure 3A:
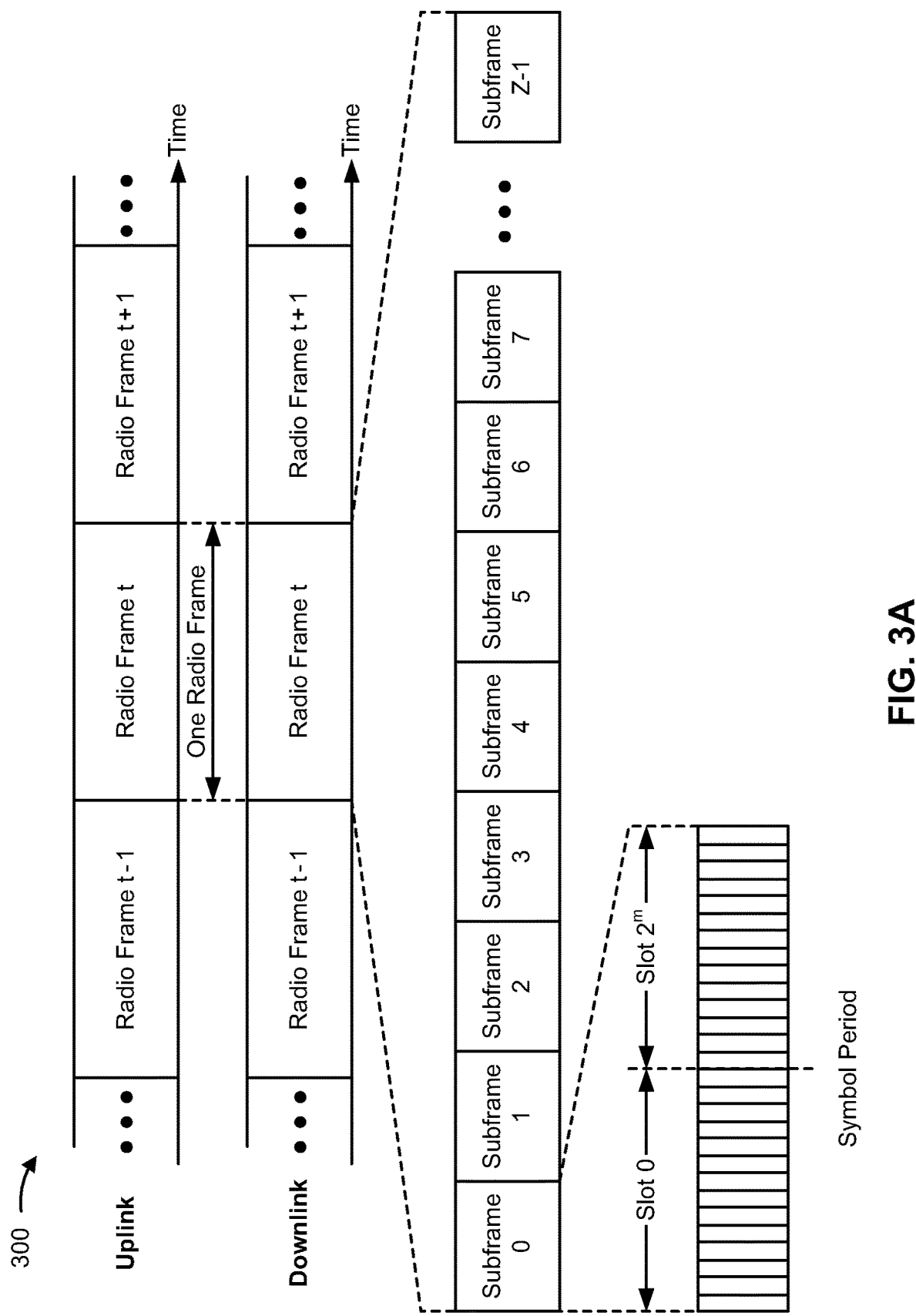
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
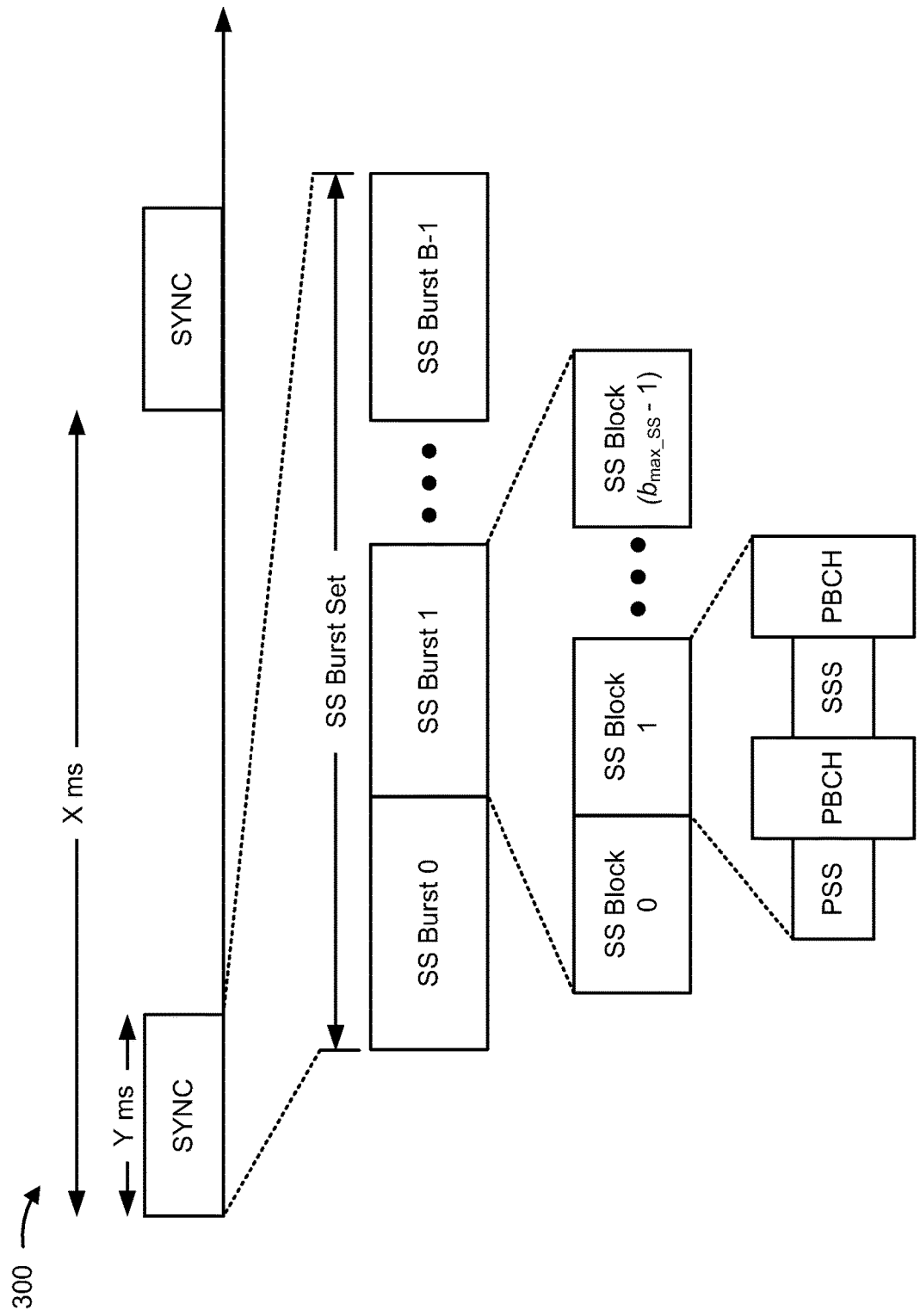
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what was described with regard to FIGS. 3A and 3B.

Figure 4:
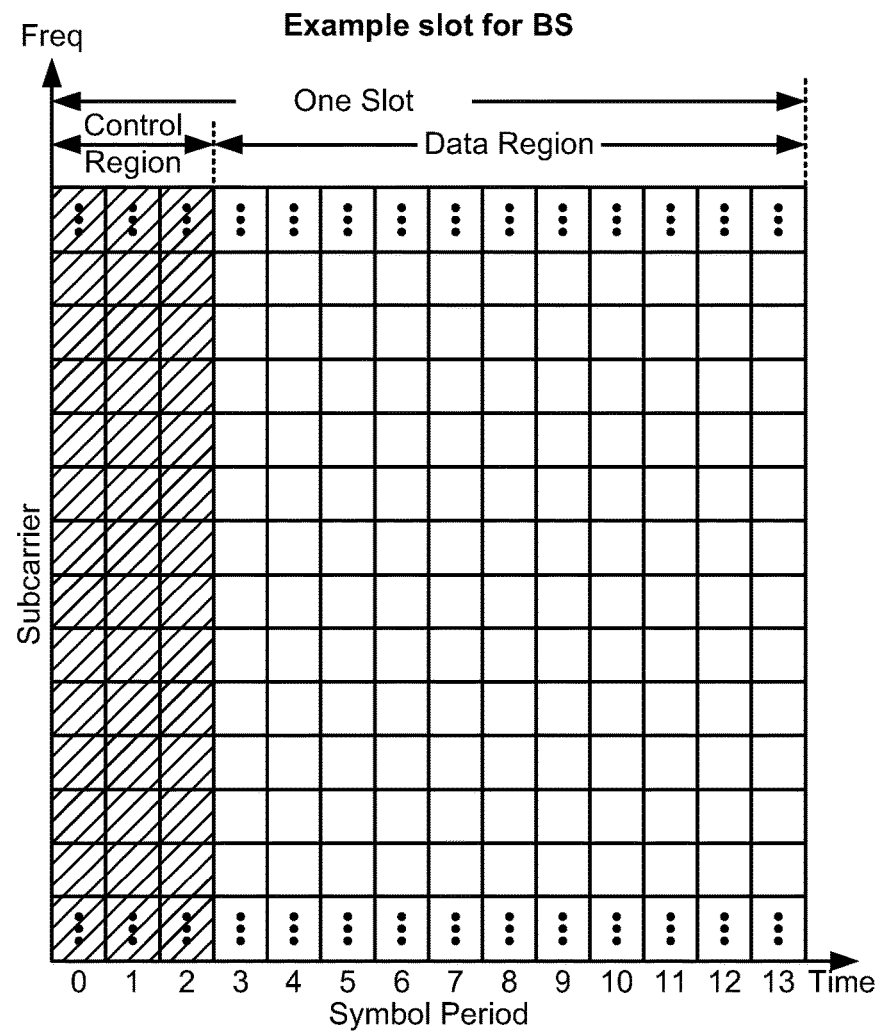
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

In a wireless network, a base station (BS) may communicate with a user equipment (UE) on a downlink. In some cases, the BS may beamform a transmission stream (e.g., a data stream, a signaling or control stream, and/or the like), that is to be transmitted to a user equipment (UE) on the downlink, to increase the signal strength, signal quality, and/or the like, of the transmission stream. To beamform the transmission stream, the BS may precode the transmission stream and may transmit the precoded transmission stream to the UE using a plurality of antenna ports. The BS may precode the transmission stream based at least in part on one or more precoding parameters (e.g., a phase shift parameter, an amplitude parameter, and/or the like) specified in a precoding matrix and/or another data structure.

In some cases, the BS may precode a transmission stream using a wideband precoder (e.g., a precoder that specifies one or more precoding parameters for the entire bandwidth of the downlink), using a subband precoder (e.g., a precoder that specifies one or more precoding parameters for a particular subband of a plurality of subbands included in the bandwidth of the downlink), and/or the like. However, if the BS precodes a reference signal (e.g., a channel state information reference signal (CSI-RS) and/or another reference signal) using the subband precoder, the UE may be unaware that the reference signal is precoded with the subband precoder and/or may be unaware of the frequency granularity of the subband precoder (e.g., the UE may be unaware of the quantity of contiguous resource blocks (RBs), of the downlink, that is precoded using the subband precoder). As a result, the UE may perform, based at least in part on the CSI-RS, a channel estimation of the downlink using the assumption that the CSI-RS is wideband precoded or is precoded with a different subband precoder (e.g., the UE may assume an incorrect subband precoder was used to precode the CSI-RS instead of the subband precoder that was actually used to precode the CSI-RS), which may cause the UE to inaccurately decode the RBs on which the CSI-RS is transmitted, may cause the UE to perform the channel estimation by decoding the wrong RBs, may cause the UE to perform the channel estimation by decoding the wrong quantity of RBs, and/or the like. This may result in an inaccurate channel estimation, which may cause the BS to inefficiently schedule downlink resources based at least in part on the inaccurate channel estimation, which in turn may cause a decrease in throughput on the downlink, a decrease in reliability on the downlink, and/or the like.

Some aspects described herein provide techniques and apparatuses for configuring channel state information reference signal subband precoding resource block groups. In some aspects, a UE may receive a signaling communication that includes information specifying whether a CSI-RS precoding resource block group includes a same quantity of RBs that is included in a CSI reporting subband configured for the UE. In this way, the UE may use the information to identify the RBs on which a subband precoded CSI-RS is transmitted by a BS so that the UE may perform a channel estimation based at least in part on the CSI-RS. This improves the accuracy of the channel estimation, which in turn increases the efficiency of downlink resource usage, increases throughput on the downlink, increases the reliability of the downlink, and/or the like.

Figure 5:
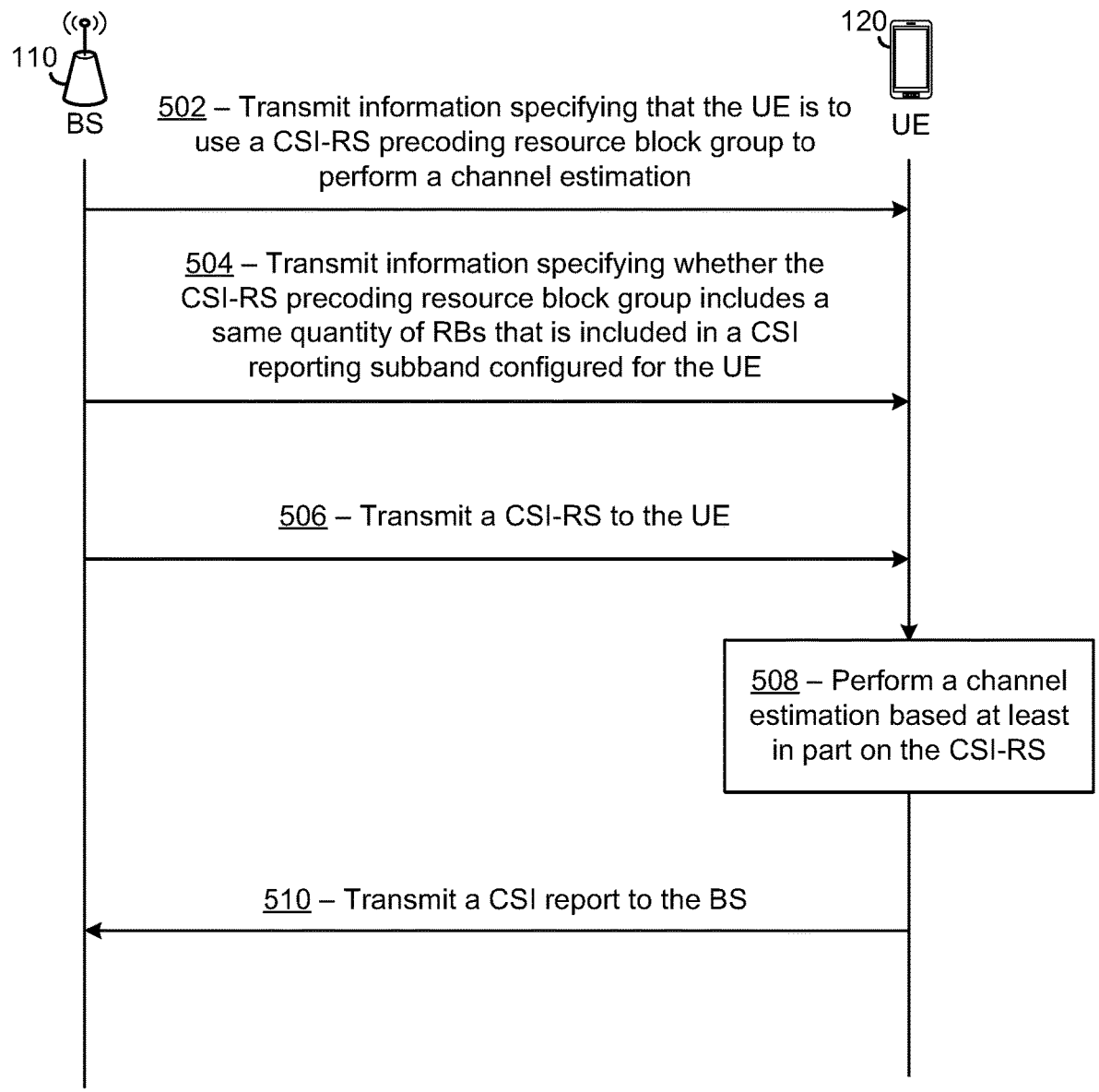
FIG. 5 is a diagram illustrating an example of configuring channel state information reference signal subband precoding resource block groups, in accordance with various aspects of the present disclosure.

FIG. 5 is a diagram illustrating an example 500 of configuring channel state information reference signal subband precoding resource block groups, in accordance with various aspects of the present disclosure. As shown in FIG. 5, example 500 may include a BS (e.g., BS 110) and a UE (e.g., UE 120). In some aspects, example 500 may include a greater quantity of BSs and/or UEs.

In some aspects, BS 110 and UE 120 may be included in a wireless network and may be communicatively connected via a wireless communication link. The wireless communication link may include a downlink and an uplink. In some aspects, the bandwidth of the downlink may be divided into a plurality of subbands. BS 110 may configure UE 120 (e.g., via a signaling communication, such as a radio resource control (RRC) communication, a downlink channel information (DCI) communication, and/or the like) to perform a channel estimation for the entire bandwidth of the downlink, to perform a channel estimation for one or more subbands of the plurality of subbands, and/or the like. UE 120 may generate a CSI report that includes information associated with the channel estimation, such as one or more channel estimation measurements (e.g., a reference signal received power (RSRP) measurement, a reference signal received quality (RSRQ) measurement, a received signal strength indicator (RSSI) measurement, a signal to interference and noise ratio (SINR) measurement, and/or the like).

In some aspects, each subband, of the plurality of subbands, may be associated with a respective subband precoder. In some aspects, each subband, of the plurality of subbands, may be associated with the same subband precoder, with different subband precoders, and/or the like. In this way, BS 110 may use the subband precoder, associated with a subband, to beamform one or more transmission streams that are transmitted using the subband. In some aspects, a subband precoder may include information that identifies one or more precoding parameters for precoding the one or more transmissions, such as a phase shift parameter (e.g., a parameter that specifies an amount of phase shift for the one or more transmissions), an amplitude parameter (e.g., a parameter that specifies a signal amplitude for the one or more transmissions), and/or the like. In some aspects, the information may be included in a codebook and/or another data structure. The codebook may include a plurality of codebook indices, where each codebook index, of the plurality of codebook indices, may be associated with a particular combination of channel estimation measurements. In this way, BS 110 may select a subband precoder to use for a particular subband based at least in part on the channel conditions in the subband.

In some aspects, each codebook index, of the plurality of codebook indices, may include a different set of precoding parameters. The precoding parameters included in a particular codebook index may be represented by a weighting matrix or another type of matrix. Moreover, a particular codebook index may include a plurality of weighting matrices, where each weighting matrix, of the plurality of weighting matrices is associated with a particular quantity of transmission streams that are to be transmitted using the subband. For example, a codebook index may include a first weighting matrix, associated with a single transmission stream, that represents a first set of precoding parameters, may include a second weighting matrix, associated with two transmission streams, that represents a second set of precoding parameters, and so on.

In some aspects, to increase the accuracy of the channel estimation of the subbands of the downlink, BS 110 may precode a CSI-RS, transmitted to UE 120, using a subband precoder. In this way, BS 110 may precode the CSI-RS to beamform the transmission stream carrying the CSI-RS to increase the signal strength of the CSI-RS, to decrease the SINR of the CSI-RS, and/or the like. In this way, the CSI-RS experiences a reduced amount of signal degradation when transmitted to UE 120, particularly if UE 120 is at or near an edge of a coverage area provided by BS 110.

As further shown in FIG. 5, and as shown by reference number 502, to configure UE 120 to perform channel estimation based at least in part on a subband precoded CSI-RS, BS 110 may transmit information specifying that UE 120 is to use a CSI-RS precoding resource block group to perform the channel estimation. In some aspects, BS 110 may transmit the information to UE 120 in a signaling communication, such as an RRC communication, a DCI communication, and/or the like.

A CSI-RS precoding resource block group may include one or more contiguous RBs (e.g., 1 RB, 4 RBs, 8 RBs, and/or the like), that are to be precoded with a particular subband precoder, on which a CSI-RS is to be transmitted. In this way, UE 120 may be configured to jointly perform the channel estimation for the one or more contiguous RBs included in the CSI-RS precoding resource block group.

As further shown in FIG. 5, and as shown by reference number 504, BS 110 may transmit, to UE 120, information specifying whether the CSI-RS precoding resource block group, for which UE 120 is to jointly perform the channel estimation, includes a same quantity of RBs that is included in a CSI reporting subband configured for UE 120. In some aspects, the CSI reporting subband, configured for UE 120, may specify a quantity of RBs for which UE 120 is to jointly generate a CSI report. In some aspects, the quantity of RBs included in the CSI reporting subband may be based at least in part on a quantity of RBs included in the bandwidth of the downlink, based at least in part on one or more configurations of RB quantities associated with each bandwidth size group of a plurality of bandwidth size groups, and/or the like. In some aspects, BS 110 may specify, in a signaling communication (e.g., RRC communication, DCI communication, and/or the like), the quantity of RBs, included in the CSI reporting subband according to a data structure, such as Table 1:

TABLE 1

| Bandwidth (# of RBs) | CSI reporting subband size (# of RBs) Configuration1 | CSI reporting subband size (# of RBs) Configuration2 |
|---|---|---|
| <24 | No Configuration Specified | No Configuration Specified |
| 24-72 | 4 | 8 |
| 73-144 | 8 | 16 |
| 145-275 | 16 | 32 |

In some aspects, BS 110 may transmit the information specifying whether the CSI-RS precoding resource block group includes the same quantity of RBs that is included in the CSI reporting subband configured for UE 120, in a signaling communication, such as an RRC communication, a DCI communication, a CSI-ResourceConfig communication, and/or the like. In this way, UE 120 may receive the information specifying that UE 120 is to use a CSI-RS precoding resource block group to perform the channel estimation, and may monitor, based at least in part on receiving the information specifying that UE 120 is to use a CSI-RS precoding resource block group to perform the channel estimation, the downlink for the signaling communication that includes the information specifying whether the CSI-RS precoding resource block group includes the same quantity of RBs that is included in the CSI reporting subband configured for UE 120.

In some aspects, the information specifying whether the CSI-RS precoding resource block group includes the same quantity of RBs that is included in the CSI reporting subband configured for UE 120 may be included a field, a flag, and/or another data structure included in the signaling communication. In some aspects, the field may include a, for example, prbg-Size-ReuseReportingConfigSubbandSize field or another type of field containing the information. In some aspects, the information, specifying whether the CSI-RS precoding resource block group includes the same quantity of RBs that is included in the CSI reporting subband configured for UE 120, may include a value included in the field. For example, the value included in the field may be a first value (e.g., a 1 value or another value) that indicates that the CSI-RS precoding resource block group includes the same quantity of RBs that is included in the CSI reporting subband configured for UE 120. As another example, the value included in the field may be a second value (e.g., a 0 value or another value) that indicates that the CSI-RS precoding resource block group does not include the same quantity of RBs that is included in the CSI reporting subband configured for UE 120 (e.g., such as when UE 120 has not been configured with a CSI reporting subband).

In some aspects, when the field includes the second value, BS 110 may further include, in the signaling communication that includes the information specifying whether the CSI-RS precoding resource block group includes the same quantity of RBs that is included in the CSI reporting subband configured for UE 120, information that explicitly specifies the quantity of RBs included in the CSI-RS precoding resource block group. In some aspects, the information that explicitly specifies the quantity of RBs included in the CSI-RS precoding resource block group may be included in another field in the signaling communication, such as a prbg-Size field and/or another type of field.

In some aspects, BS 110 may specify the quantity of RBs included in the CSI-RS precoding resource block group based at least in part on the a size of the bandwidth of the downlink. For example, BS 110 may specify the quantity of RBs included in the CSI-RS precoding resource block group based at least in part on a quantity of RBs included in the bandwidth of the downlink, based at least in part on one or more configurations of RB quantities associated with each bandwidth size group of a plurality of bandwidth size groups, and/or the like. In some aspects, BS 110 may specify the quantity of RBs included in the CSI-RS precoding resource block group according to a data structure, such as Table 2:

TABLE 2

| Bandwidth (# of RBs) | Precoding resource block group size (# of RBs) Configuration1 | Precoding resource block group size (# of RBs) Configuration |
|---|---|---|
| 1-36 | 1 | 2 |
| 36-72 | 2 | 4 |
| 73-144 | 4 | 8 |
| 145-275 | 8 | 16 |

In some aspects, BS 110 may further include, in the signaling communication that includes the information specifying whether the CSI-RS precoding resource block group includes the same quantity of RBs that is included in the CSI reporting subband configured for UE 120, information identifying the RBs that are included in the CSI-RS precoding resource block group. For example, the information, identifying the RBs that are included in the CSI-RS precoding resource block group, may include information specifying an RB, included in the downlink, at which the one or more contiguous RBs, included in the CSI-RS precoding resource block group, starts. Accordingly, UE 120 may receive the signaling communication, may identify the RB, at which the CSI-RS precoding resource block group starts, based at least in part on the information specifying the RB at which the one or more contiguous RBs starts, and may identify the remaining RBs, included in the CSI-RS precoding resource block group, based at least in part on either the quantity of RBs specified in the CSI reporting subband configured for UE 120 or the information that explicitly specifies the quantity of RBs included in the CSI-RS precoding resource block group.

As further shown in FIG. 5, and as shown by reference number 506, BS 110 may transmit the CSI-RS to UE 120. In some aspects, BS 110 may periodically and/or semi-persistently transmit the CSI-RS to UE 120 at a particular time interval, may aperiodically transmit the CSI-RS to UE 120 (e.g., based at least in part on detecting the occurrence of an event such as UE 120 entering the coverage area of BS 110, and/or the like), and/or the like.

In some aspects, BS 110 may transmit, to UE 120, the CSI-RS on the one or more contiguous RBs, specified in the CSI-RS precoding resource block group, that are included in the downlink. For example, BS 110 may generate one or more transmission streams for the CSI-RS, may beamform or precode the one or more transmission streams using a subband precoder, and may transmit the precoded one or more transmission streams to UE 120 on the one or more contiguous RBs, specified in the CSI-RS precoding resource block group, that are included in the downlink. In some aspects, the subband precoder that BS 110 uses to beamform or precode the one or more transmissions streams may be the same subband precoder that BS 110 is to use to precode a physical downlink shared channel (PDSCH) transmission that is to be transmitted by the BS 110 on the downlink. In some aspects, the subband precoder that BS 110 uses to beamform or precode the one or more transmissions streams may be a different subband precoder than that which BS 110 is to use to precode the PDSCH transmission.

As further shown in FIG. 5, and as shown by reference number 508, UE 120 may receive the CSI-RS from BS 110 and may perform a channel estimation of the downlink based at least in part on the CSI-RS. For example, UE 120 may periodically and/or semi-persistently perform a channel estimation at a particular time interval, may aperiodically perform a channel estimation (e.g., based at least in part on receiving a CSI report request from BS 110, based at least in part on detecting the occurrence of an event such as UE 120 entering the coverage area of BS 110, and/or the like), and/or the like.

In some aspects, UE 120 may perform the channel estimation by decoding the one or more contiguous RBs on which the CSI-RS is transmitted by BS 110, and performing one or more channel state measurements for the one or more contiguous RBs. In some aspects, the one or more channel state measurements may include a reference signal received power (RSRP) measurement, a reference signal received quality (RSRQ) measurement, a received signal strength indicator (RSSI) measurement, a channel quality indicator (CQI) measurement, a multiple user CQI (MU-CQI) measurement, a precoding matrix indicator (PMI) measurement, a rank indicator (RI) measurement a signal to interference and noise ratio (SINR) measurement, and/or the like.

As further shown in FIG. 5, and as shown by reference number 510, UE 120 may generate and transmit, to BS 110, a CSI report that includes information associated with the channel estimation performed by UE 120, such as the one or more channel state measurements and/or the like. In some aspects, UE 120 may transmit the CSI report to BS 110 based at least in part on performing the channel estimation, may transmit the CSI report to BS 110 at a periodic interval, may transmit the CSI report to BS 110 based at least in part on receiving a request for the CSI report from BS 110, and/or the like.

In this way, UE 120 may use the information to identify the one or more contiguous RBs on which the subband precoded CSI-RS is transmitted by BS 110 so that UE 120 may perform a channel estimation based at least in part on the CSI-RS. In this way, BS 110 may use the channel estimation to optimize one or more operating parameters for the downlink, such as selecting a different subband precoder for a PDSCH transmission to UE 120, selecting a different downlink resource allocation for UE 120, and/or the like. This improves the accuracy of the channel estimation, which in turn increases the efficiency of downlink resource usage, increases the reliability of the downlink, and/or the like, which in turn enables BS 110 to serve a greater quantity of user equipment, enables BS 110 to provide increased downlink throughput to UE 120, and/or the like.

As indicated above, FIG. 5 is provided as an example. Other examples may differ from what was described with respect to FIG. 5.

Figure 6:
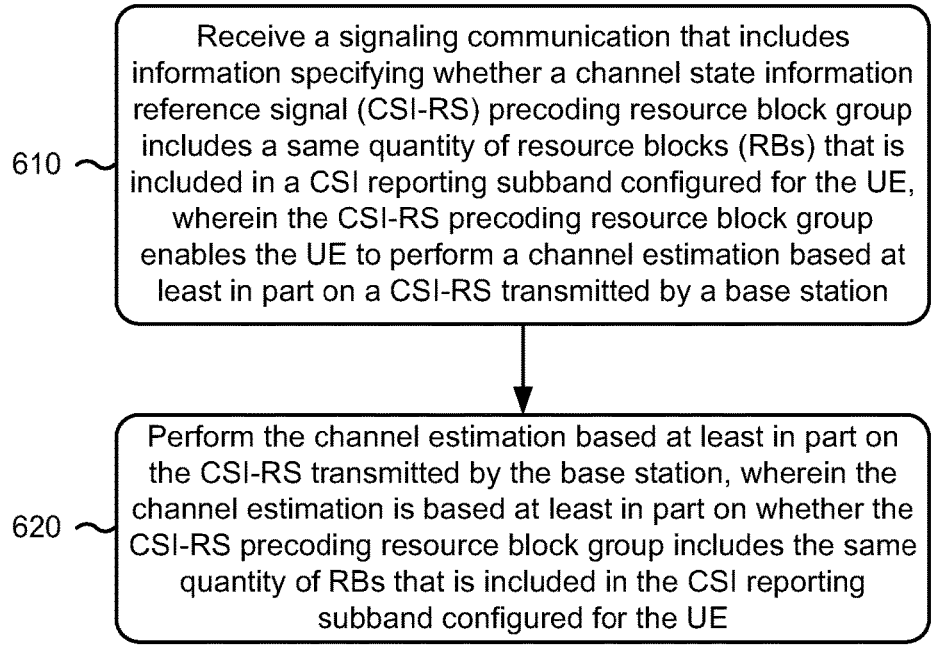
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 can include a method of wireless communication performed by a UE, for example, where a UE (e.g., UE 120) performs configuring channel state information reference signal subband precoding resource block groups.

As shown in FIG. 6, in some aspects, process 600 may include receiving a signaling communication that includes information specifying whether a channel state information reference signal (CSI-RS) precoding resource block group includes a same quantity of resource blocks (RBs) that is included in a CSI reporting subband configured for the UE, wherein the CSI-RS precoding resource block group enables the UE to perform a channel estimation based at least in part on a CSI-RS transmitted by a base station (block 610). For example, the UE (e.g., using receive processor 258, controller/processor 280, memory 282, and/or the like) may receive a signaling communication that includes information specifying whether a channel state information reference signal (CSI-RS) precoding resource block group includes a same quantity of resource blocks (RBs) that is included in a CSI reporting subband configured for the UE, as described above. In some aspects, the CSI-RS precoding resource block group enables the UE to perform a channel estimation based at least in part on a CSI-RS transmitted by a base station.

As further shown in FIG. 6, in some aspects, process 600 may include performing the channel estimation based at least in part on the CSI-RS transmitted by the base station, wherein the channel estimation is based at least in part on whether the CSI-RS precoding resource block group includes the same quantity of RBs that is included in the CSI reporting subband configured for the UE (block 620). For example, the UE (e.g., using controller/processor 280, memory 282, and/or the like) may perform the channel estimation based at least in part on the CSI-RS transmitted by the base station, as described above. In some aspects, the channel estimation is based at least in part on whether the CSI-RS precoding resource block group includes the same quantity of RBs that is included in the CSI reporting subband configured for the UE.

Process 600 may include additional aspects, such as any single aspect and/or any combination of aspects described below and/or in connection with one or more other processes described elsewhere herein.

In some aspects, the CSI-RS transmitted by the base station comprises a pre-scheduled CSI-RS transmission for a multiple user channel quality indicator (MU-CQI) measurement, a CSI-RS transmission for CSI feedback, a CSI-RS transmission for radio resource management (RRM), a CSI-RS transmission for beam management, and/or the like. In some aspects, the CSI-RS precoding resource block group is precoded with a subband precoder. In some aspects, the subband precoder is a same subband precoder that is used to precode a physical downlink shared channel (PDSCH) transmission that is to be transmitted by the base station.

In some aspects, the subband precoder, and another subband precoder that is used to precode a physical downlink shared channel (PDSCH) transmission that is to be transmitted by the base station, are different subband precoders. In some aspects, the CSI-RS, transmitted by the base station, is beamformed using the subband precoder.

In some aspects, the information specifying whether the CSI-RS precoding resource block group includes the same quantity of RBs that is included in the CSI reporting subband configured for the UE comprises a value included in a field that is included in the signaling communication. In some aspects, the value included in the field comprises one of a first value that indicates the CSI-RS precoding resource block group includes the same quantity of RBs that is included in the CSI reporting subband configured for the UE, or a second value that indicates the CSI-RS precoding resource block group does not include the same quantity of RBs that is included in the CSI reporting subband configured for the UE.

In some aspects, the field that is included in the signaling communication comprises a prbg-Size-ReuseReportingConfigSubbandSize field or other field. In some aspects, when performing the channel estimation based at least in part on the CSI-RS transmitted by the base station, the UE may be configured to perform a channel state measurement for a set of RBs associated with the CSI-RS transmitted by the base station, wherein the set of RBs includes the same quantity of RBs as the CSI-RB precoding resource block group.

In some aspects, the channel state measurement comprises at least one of a reference signal received power (RSRP) measurement, a reference signal received quality (RSRQ) measurement, a received signal strength indicator (RSSI) measurement, a channel quality indicator (CQI) measurement, a multiple user CQI (MU-CQI) measurement, a precoding matrix indicator (PMI) measurement, a rank indicator (RI) measurement, or a signal to interference and noise ratio (SINR) measurement. In some aspects, the information specifies that the CSI-RS precoding resource block group does not include the same quantity of RBs that is specified in the CSI reporting subband size configured for the UE, and the signaling communication includes information specifying that the CSI-RS precoding resource block group includes another quantity of RBs.

In some aspects, the information specifying that the CSI-RS precoding resource block group includes another quantity of RBs comprises information identifying a CSI-RS precoding resource block group configuration of a plurality of CSI-RS precoding resource block group configurations. In some aspects, when determining whether the UE is to perform the channel estimation based at least in part on the CSI-RS precoding resource block group, the UE may be configured to receive information specifying that the UE is to perform the channel estimation based at least in part on the CSI-RS precoding resource block group. Hence, in some aspects, process 600 may optionally further include the CSI-RS receiving the information specifying that the UE is to perform the channel estimation based at least in part on the CSI-RS precoding resource block group. Hence, in some such aspects, the performing of the channel estimation of block 620 may be responsive to or otherwise based on the received information specifying that the UE is to perform the channel estimation.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
 receiving a signaling communication that includes a field comprising a flag specifying whether a channel state information reference signal (CSI-RS) precoding resource block group includes a same quantity of resource blocks (RBs) that is included in a CSI reporting subband configured for the UE,
  wherein the CSI-RS precoding resource block group enables the UE to perform a channel estimation based at least in part on a CSI-RS transmitted by a base station; and
 performing the channel estimation based at least in part on the CSI-RS transmitted by the base station,
  wherein the channel estimation is based at least in part on whether the CSI-RS precoding resource block group includes the same quantity of RBs that is included in the CSI reporting subband configured for the UE.

2. The method of claim 1, wherein the CSI-RS transmitted by the base station comprises:
 a pre-scheduled CSI-RS transmission for a multiple user channel quality indicator (MU-CQI) measurement,
 a CSI-RS transmission for CSI feedback,
 a CSI-RS transmission for radio resource management (RRM), or
 a CSI-RS transmission for beam management.

3. The method of claim 1, wherein the CSI-RS precoding resource block group is precoded with a subband precoder; and
 wherein the CSI-RS, transmitted by the base station, is beamformed using the subband precoder.

4. The method of claim 3, wherein the subband precoder is a same subband precoder that is used to precode a physical downlink shared channel (PDSCH) transmission that is to be transmitted by the base station, or
 wherein the subband precoder, and another subband precoder that is used to precode a physical downlink shared channel (PDSCH) transmission that is to be transmitted by the base station, are different subband precoders.

5. The method of claim 1,
 wherein the flag included in the field comprises one of:
  a first value that indicates the CSI-RS precoding resource block group includes the same quantity of RBs that is included in the CSI reporting subband configured for the UE, or
  a second value that indicates the CSI-RS precoding resource block group does not include the same quantity of RBs that is included in the CSI reporting subband configured for the UE; and
 wherein the field that is included in the signaling communication comprises:
  a prbg-Size-ReuseReportingConfigSubbandSize field.

6. The method of claim 1, wherein performing the channel estimation based at least in part on the CSI-RS transmitted by the base station comprises:
 performing a channel state measurement for one or more contiguous RBs on which the CSI-RS is transmitted by the base station,
  wherein the one or more contiguous RBs includes the same quantity of RBs as the CSI-RS precoding resource block group; and
 wherein the channel state measurement comprises at least one of:
  a reference signal received power (RSRP) measurement,
  a reference signal received quality (RSRQ) measurement,
  a received signal strength indicator (RSSI) measurement,
  a channel quality indicator (CQI) measurement,
  a multiple user CQI (MU-CQI) measurement,
  a precoding matrix indicator (PMI) measurement,
  a rank indicator (RI) measurement, or
  a signal to interference and noise ratio (SINR) measurement.

7. The method of claim 1, wherein the flag specifies that the CSI-RS precoding resource block group does not include the same quantity of RBs that is specified in the CSI reporting subband configured for the UE;
 wherein the signaling communication includes information specifying that the CSI-RS precoding resource block group includes another quantity of RBs; and wherein the information specifying that the CSI-RS precoding resource block group includes another quantity of RBs comprises:
information identifying a CSI-RS precoding resource block group configuration of a plurality of CSI-RS precoding resource block group configurations.

8. The method of claim 1, further comprising:
receiving information specifying that the UE is to perform the channel estimation based at least in part on the CSI-RS precoding resource block group.

9. The method of claim 1, further comprising:
determining that the UE has not received information specifying that the UE is to perform the channel estimation based at least in part on the CSI-RS precoding resource block group; and
performing, based at least in part on determining that the UE has not received the information specifying that the UE is to perform the channel estimation based at least in part on the CSI-RS precoding resource block group, the channel estimation based at least in part on the CSI-RS being wideband precoded.

10. A user equipment (UE) for wireless communication, comprising:
a memory; and
one or more processors operatively coupled to the memory, the memory and the one or more processors configured to:
receive a signaling communication that includes a field comprising a flag specifying whether a channel state information reference signal (CSI-RS) precoding resource block group includes a same quantity of resource blocks (RBs) that is included in a CSI reporting subband configured for the UE,
wherein the CSI-RS precoding resource block group enables the UE to perform a channel estimation based at least in part on a CSI-RS transmitted by a base station; and
perform the channel estimation based at least in part on the CSI-RS transmitted by the base station,
wherein the channel estimation is based at least in part on whether the CSI-RS precoding resource block group includes the same quantity of RBs that is included in the CSI reporting subband configured for the UE.

11. The UE of claim 10, wherein the CSI-RS transmitted by the base station comprises:
a pre-scheduled CSI-RS transmission for a multiple user channel quality indicator (MU-CQI) measurement,
a CSI-RS transmission for CSI feedback,
a CSI-RS transmission for radio resource management (RRM), or
a CSI-RS transmission for beam management.

12. The UE of claim 10, wherein the CSI-RS precoding resource block group is precoded with a subband precoder; and
wherein the CSI-RS, transmitted by the base station, is beamformed using the subband precoder.

13. The UE of claim 12, wherein the subband precoder is a same subband precoder that is used to precode a physical downlink shared channel (PDSCH) transmission that is to be transmitted by the base station, or
wherein the subband precoder, and another subband precoder that is used to precode a physical downlink shared channel (PDSCH) transmission that is to be transmitted by the base station, are different subband precoders.

14. The UE of claim 10,
wherein the flag included in the field comprises one of:
a first value that indicates the CSI-RS precoding resource block group includes the same quantity of RBs that is included in the CSI reporting subband configured for the UE, or
a second value that indicates the CSI-RS precoding resource block group does not include the same quantity of RBs that is included in the CSI reporting subband configured for the UE; and
wherein the field that is included in the signaling communication comprises:
a prbg-Size-ReuseReportingConfigSubbandSize field.

15. The UE of claim 10, wherein the one or more processors, when performing the channel estimation based at least in part on the CSI-RS transmitted by the base station, are to:
perform a channel state measurement for one or more contiguous RBs on which the CSI-RS is transmitted by the base station,
wherein the one or more contiguous RBs includes the same quantity of RBs as the CSI-RS precoding resource block group; and
wherein the channel state measurement comprises at least one of:
a reference signal received power (RSRP) measurement,
a reference signal received quality (RSRQ) measurement,
a received signal strength indicator (RSSI) measurement,
a channel quality indicator (CQI) measurement,
a multiple user CQI (MU-CQI) measurement,
a precoding matrix indicator (PMI) measurement,
a rank indicator (RI) measurement, or
a signal to interference and noise ratio (SINR) measurement.

16. The UE of claim 10, wherein the flag specifies that the CSI-RS precoding resource block group does not include the same quantity of RBs that is specified in the CSI reporting subband configured for the UE;
wherein the signaling communication includes information specifying that the CSI-RS precoding resource block group includes another quantity of RBs;
wherein the information specifying that the CSI-RS precoding resource block group includes another quantity of RBs comprises:
information identifying a CSI-RS precoding resource block group configuration of a plurality of CSI-RS precoding resource block group configurations.

17. The UE of claim 10, wherein the one or more processors are further to:
receive information specifying that the UE is to perform the channel estimation based at least in part on the CSI-RS precoding resource block group.

18. The UE of claim 10, wherein the one or more processors are further to:
determine that the UE has not received information specifying that the UE is to perform the channel estimation based at least in part on the CSI-RS precoding resource block group; and
perform, based at least in part on determining that the UE has not received the information specifying that the UE is to perform the channel estimation based at least in part on the CSI-RS precoding resource block group, the channel estimation based at least in part on the CSI-RS being wideband precoded.

19. A non-transitory computer-readable medium storing one or more instructions for wireless communication, the one or more instructions comprising:
one or more instructions that, when executed by one or more processors of a user equipment (UE), cause the one or more processors to:
receive a signaling communication that includes a field comprising a flag specifying whether a channel state information reference signal (CSI-RS) precoding resource block group includes a same quantity of resource blocks (RBs) that is included in a CSI reporting subband configured for the UE,
wherein the CSI-RS precoding resource block group enables the UE to perform a channel estimation based at least in part on a CSI-RS transmitted by a base station; and
perform the channel estimation based at least in part on the CSI-RS transmitted by the base station,
wherein the channel estimation is based at least in part on whether the CSI-RS precoding resource block group includes the same quantity of RBs that is included in the CSI reporting subband configured for the UE.

20. The non-transitory computer-readable medium of claim 19, wherein the CSI-RS transmitted by the base station comprises:
a pre-scheduled CSI-RS transmission for a multiple user channel quality indicator (MU-CQI) measurement.

21. The non-transitory computer-readable medium of claim 19, wherein the CSI-RS transmitted by the base station comprises:
a CSI-RS transmission for CSI feedback.

22. An apparatus for wireless communication, comprising:
means for receiving a signaling communication that includes a field comprising a flag specifying whether a channel state information reference signal (CSI-RS) precoding resource block group includes a same quantity of resource blocks (RBs) that is included in a CSI reporting subband configured for the apparatus,
wherein the CSI-RS precoding resource block group enables the apparatus to perform a channel estimation based at least in part on a CSI-RS transmitted by a base station; and
means for performing the channel estimation based at least in part on the CSI-RS transmitted by the base station,
wherein the channel estimation is based at least in part on whether the CSI-RS precoding resource block group includes the same quantity of RBs that is included in the CSI reporting subband configured for the apparatus.

23. The apparatus of claim 22, wherein the CSI-RS transmitted by the base station comprises:
a pre-scheduled CSI-RS transmission for a multiple user channel quality indicator (MU-CQI) measurement,
a CSI-RS transmission for CSI feedback,
a CSI-RS transmission for radio resource management (RRM), or
a CSI-RS transmission for beam management.

24. The apparatus of claim 22, wherein the CSI-RS precoding resource block group is precoded with a subband precoder and
wherein the CSI-RS, transmitted by the base station, is beamformed using the subband precoder.

25. The apparatus of claim 24, wherein the subband precoder is a same subband precoder that is used to precode a physical downlink shared channel (PDSCH) transmission that is to be transmitted by the base station; and
wherein the subband precoder, and another subband precoder that is used to precode a physical downlink shared channel (PDSCH) transmission that is to be transmitted by the base station, are different subband precoders.

26. The apparatus of claim 22, the flag included in the field comprises one of:
a first value that indicates the CSI-RS precoding resource block group includes the same quantity of RBs that is included in the CSI reporting subband configured for the apparatus, or
a second value that indicates the CSI-RS precoding resource block group does not include the same quantity of RBs that is included in the CSI reporting subband configured for the apparatus; and
wherein the field that is included in the signaling communication comprises:
a prbg-Size-ReuseReportingConfigSubbandSize field.

27. The apparatus of claim 22, wherein performing the channel estimation based at least in part on the CSI-RS transmitted by the base station comprises:
means for performing a channel state measurement for one or more contiguous RBs on which the CSI-RS is transmitted by the base station,
wherein the one or more contiguous RBs includes the same quantity of RBs as the CSI-RS precoding resource block group; and
wherein the channel state measurement comprises at least one of:
a reference signal received power (RSRP) measurement,
a reference signal received quality (RSRQ) measurement,
a received signal strength indicator (RSSI) measurement,
a channel quality indicator (CQI) measurement,
a multiple user CQI (MU-CQI) measurement,
a precoding matrix indicator (PMI) measurement,
a rank indicator (RI) measurement, or
a signal to interference and noise ratio (SINR) measurement.

28. The apparatus of claim 22, wherein the flag specifies that the CSI-RS precoding resource block group does not include the same quantity of RBs that is specified in the CSI reporting subband configured for the apparatus;
wherein the signaling communication includes information specifying that the CSI-RS precoding resource block group includes another quantity of RBs; and
wherein the information specifying that the CSI-RS precoding resource block group includes another quantity of RBs comprises:
information identifying a CSI-RS precoding resource block group configuration of a plurality of CSI-RS precoding resource block group configurations.

29. The apparatus of claim 22, further comprising:
means for receiving information specifying that the apparatus is to perform the channel estimation based at least in part on the CSI-RS precoding resource block group.

30. The apparatus of claim 22, further comprising:
means for determining that the apparatus has not received information specifying that the apparatus is to perform the channel estimation based at least in part on the CSI-RS precoding resource block group; and
means for performing, based at least in part on determining that the apparatus has not received the information specifying that the apparatus is to perform the channel estimation based at least in part on the CSI-RS precoding resource block group, the channel estimation based at least in part on the CSI-RS being wideband precoded.

\* \* \* \* \*